United States Patent
Wu

(10) Patent No.: US 8,247,066 B2
(45) Date of Patent: Aug. 21, 2012

(54) TEFLON FUSER MEMBER CONTAINING FLUORINATED NANO DIAMONDS

(75) Inventor: Jin Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 426 days.

(21) Appl. No.: 12/436,554

(22) Filed: May 6, 2009

(65) Prior Publication Data

US 2010/0285303 A1 Nov. 11, 2010

(51) Int. Cl.
- *B32B 15/08* (2006.01)
- *B32B 27/08* (2006.01)
- *B32B 27/20* (2006.01)
- *G03G 15/20* (2006.01)

(52) U.S. Cl. ......... 428/323; 428/421; 428/422; 399/333

(58) Field of Classification Search ........................ None
See application file for complete search history.

(56) References Cited

U.S. PATENT DOCUMENTS

| | | | |
|---|---|---|---|
| 4,511,373 A | 4/1985 | Taylor et al. | |
| 5,674,621 A | 10/1997 | Visser et al. | |
| 5,761,595 A | 6/1998 | Tarnawskyj et al. | |
| 6,397,034 B1 | 5/2002 | Tarnawskyj et al. | |
| 2002/0093072 A1 | 7/2002 | Farquhar et al. | |
| 2004/0165917 A1* | 8/2004 | Sugawara et al. | 399/333 |
| 2007/0095676 A1 | 5/2007 | Yamada et al. | |
| 2007/0173595 A1 | 7/2007 | Tsuji et al. | |
| 2008/0152405 A1 | 6/2008 | Kuntz et al. | |

FOREIGN PATENT DOCUMENTS

| | | |
|---|---|---|
| WO | 2007070601 | 6/2007 |
| WO | 2007148667 | 12/2007 |

OTHER PUBLICATIONS

Machine translation of JP 2008-001812, Jan. 2008.*
English translation of WO 2007/148667 A1, Dec. 2007.*
U.S. Appl. No. 12/436,600, "Viton Fuser Member Containing Fluorinated Nano Diamonds", filed May 6, 2009, Jin Wu.
European Patent Office, European Search Report, European Application No. 10160887.5, Aug. 23, 2010, 3 Pages.

* cited by examiner

*Primary Examiner* — Ramsey Zacharia

(74) *Attorney, Agent, or Firm* — MH2 Technology Law Group LLP

(57) ABSTRACT

Exemplary embodiments provide a coating composition for an outermost layer of a fuser member that can include a plurality of fluorinated diamond-containing particles dispersed in a fluororesin matrix.

10 Claims, 2 Drawing Sheets

TEFLON FUSER MEMBER CONTAINING FLUORINATED NANO DIAMONDS

DETAILED DESCRIPTION

1. Field of Use

The present teachings relate generally to fuser members used for electrostatographic devices and, more particularly, to a fuser member having an outermost layer that includes fluorinated diamond-containing particles dispersed in a fluororesin matrix.

2. Background

In electrostatography, also known as xerography, electrophotographic imaging or electrostatographic imaging, an imaging process includes forming a visible toner image on a support surface (e.g., a sheet of paper). The visible toner image is often transferred from a photoreceptor that contains an electrostatic latent image and is usually fixed or fused onto the support surface using a fuser member to form a permanent image.

In current electrophotographic processes, two major types of fuser outermost materials are used for the fusing technologies. The two major types of materials include fluoroelastomers, for example, VITON® from E.I. DuPont de Nemours, Inc. (Wilmington, Del.), and fluoroplastics, for example, TEFLON® also from E.I. DuPont de Nemours, Inc. (Wilmington, Del.).

VITON® fluoroelastomers are used to provide the fuser members good mechanical flexibility with an ability to absorb shock energy. Also, VITON® fluoroelastomers allow high speed operation with high print quality VITON® fluoroelastomers have more of a "rubber" property and may be used in conjunction with release agents or fusing oils.

TEFLON® fluoroplastics are widely used for oil-less fusing, i.e., with no fusing oils required during fusing operations. TEFLON® fluoroplastics may include a TEFLON® PFA (perfluoroalkylvinylether copolymer) surface disposed over a conformable silicone layer, which enables rough paper fix and good uniformity. In addition, the TEFLON® PFA surface may provide thermal/chemical resistance for the fuser members. Problems still arise, however, due to insufficient mechanical strength and decreased wear resistance of the TEFLON® materials.

Conventional approaches for solving these problems include adding fillers into the outermost materials of fuser members. Conventional fillers include carbon black, metal oxides, and carbon nanotubes (CNTs). However, other fillers to further improve mechanical properties (e.g., modulus and/or hardness) and wear resistances of the outermost fuser materials are still desirable.

Thus, there is a need to overcome these and other problems of the prior art and to provide a coating composition for an outermost fuser material having fluorinated diamond-containing particles.

SUMMARY

According to various embodiments, the present teachings include a coating composition that includes a mixture of a fluororesin polymer and a plurality of fluorinated diamond-containing particles. The fluorinated diamond-containing particle can include a chemically active shell layer over a diamond core, while the chemically active shell layer can include an atom of fluorine. The coating composition can be used as an outermost fuser material for electrostatographic/electrophotographic printing devices with improved mechanical-/electrical-/surface-properties, and the life time.

According to various embodiments, the present teachings also include a fuser member. The fuser member can include an outermost layer disposed over a substrate. The outermost layer can further include a plurality of fluorinated nano diamond-containing particles dispersed in a fluoroplastic matrix. The fluorinated nano diamond-containing particle can include a chemically active shell layer, which is fluorinated, over a chemically inert diamond core. In embodiments, one or more other functional layers can be disposed between the substrate and the outermost layer for the disclosed fuser member.

According to various embodiments, the present teachings further include a method for making a fuser member. To make the fuser member, a coating composition can be formed to include a fluororesin polymer and a plurality of fluorinated diamond-containing particles in an aqueous solution. In this solution, the fluorinated diamond-containing particle can include a chemically active shell layer disposed over a diamond core with the chemically active shell layer including an atom of fluorine. Such coating composition can then be applied to a belt substrate to form an outermost layer of the fuser member. In embodiments, one or more functional layers can be formed between the belt substrate and the outermost layer to form the disclosed fuser member.

Additional objects and advantages of the present teachings will be set forth in part in the description which follows, and in part will be obvious from the description, or may be learned by practice of the present teachings. The objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1A:
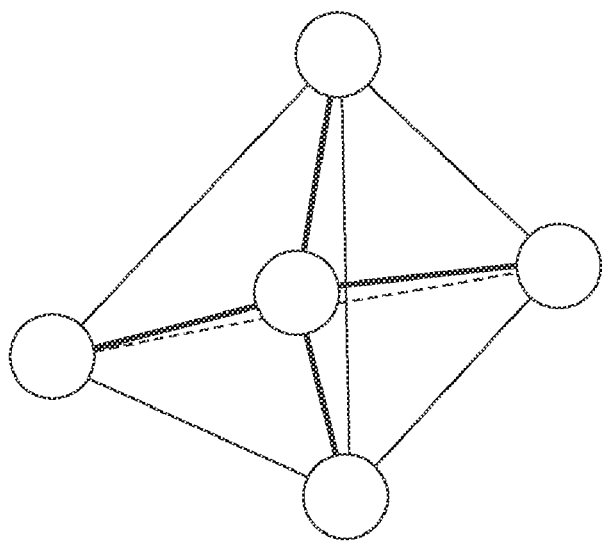
FIG. 1A is a schematic showing an exemplary structure of a diamond core used for fluorinated diamond-containing particles in accordance with various embodiments of the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide materials and methods for a coating composition for an outermost fuser material and the related fuser member. The coating composition and the outermost fuser material can include fluorinated diamond-containing particles dispersed in a polymer matrix that includes one or more fluororesins, fluoroplastics, or other resins. A fuser member that includes the disclosed outermost fuser material can be used in electrophotographic printing devices and processes. Exemplary fuser members can have improved mechanical properties, surface wear resistance, and life time.

As used herein and unless otherwise specified, the term "fluorinated diamond-containing particles" refers to any "diamond-containing particles" that contain atoms of fluorine. For example, the "fluorinated diamond-containing particles" can include fluoro-functional groups that are physically bonded (e.g., ionic bond, hydrogen bond, or van der walls) or chemically bonded (i.e., covalent bond) to the diamond-containing particles.

As used herein and unless otherwise specified, the term "diamond-containing particles" can include a core-shell structure having a chemically active shell layer surrounding a chemically inert diamond core. For example, the chemically active shell layer can include carbon black of $sp^2$ carbon that shells around a diamond core of $sp^3$ carbon. The $sp^2$ carbon black shell can be chemically modified with various functional groups (including fluoro-groups), while the $sp^3$ diamond core can not be chemically modified due to the saturated carbon of diamond core.

In various embodiments, the "diamond-containing particles" can be commercially available in a form of powder or dispersion, for example, from Nanoblox, Inc. (Boca Raton, Fla.). Examples of commercially available diamond-containing particles can include raw nano diamond black (e.g., product NB50) possessing 50 percent of $sp^3$ carbon core and 50 percent of $sp^2$ carbon shell, and nano diamond grey (e.g., product NB90) possessing 90 percent of $sp^3$ carbon core and 10 percent of $sp^2$ carbon shell.

In various embodiments, the "fluorinated diamond-containing particles" can also be commercially available, for example, from Nanoblox, Inc. (Boca Raton, Fla.). Examples of commercially available fluorinated diamond-containing particles can include product NB90-F possessing 90 percent of $sp^3$ carbon core and 10 percent of $sp^2$ carbon shell that is fluorinated.

In various embodiments, the fluorinated diamond-containing particles can be formed by fluorinating the chemically active shell, e.g., the carbon black $sp^2$, of the diamond-containing particles. For example, the core-shelled diamond-containing particles can be treated by reacting with fluorine, while the amount of fluorine can be varied in order to produce specific desired properties. In various embodiments, the fluorinated diamond-containing particles can be concentrated with, for example, poly(carbon monofluoride), poly(dicarbon monofluoride) or their combinations. Specifically, poly(carbon monofluoride) can have a formula of $CF_x$, wherein x represents the number of fluorine atoms and is a number of from about 0.01 to about 1.5, while poly(dicarbon monofluoride) is usually written in the shorthand manner of $(C_2F)_n$ as known to one of ordinary skill in the art.

The methods for fluorination are well known and documented in the literature, such as in the U.S. Pat. No. 6,397,034, entitled "Fluorinated Carbon Filled Polyimide Intermediate Transfer Components," which is herein incorporated by reference in its entirety. Generally, the fluorination can be conducted by heating the carbon black shell of the diamond-containing particles with elemental fluorine at elevated temperatures, such as from about 150° C. to about 600° C. A diluent such as nitrogen can be preferably admixed with the fluorine. The nature and properties of the resulting fluorinated particles can vary with the conditions of reaction and with the degree of fluorination obtained in the final product. The degree of fluorination in the final product may be varied by changing the process reaction conditions, principally, temperature and time. For example, the higher the temperature and the longer the time, the higher the fluorine content.

In various embodiments, the fluorinated diamond-containing particles can include a fluorine content ranging from about 1 percent to about 40 percent by weight of the total particles. In an additional example, the fluorine content can range from about 2 percent to about 30 percent by weight of the total fluorinated diamond-containing particles, or in some cases, rang from about 5 percent to about 20 percent by weight of the total particles.

In various embodiments, the fluorinated diamond-containing particles can be surface modified to provide additional functional surfaces. For example, the chemically active shell layer of the particles can be modified to have a spectrum of chemically functional groups selected from the group consisting of —OH, —COOH, —NH$_2$, —SO$_3$H, alkyl, carboxylated amine and quaternerized amine.

These functional groups can be directly linked to, e.g., the $sp^2$ carbon black shell, and can further provide desired properties for the fluorinated diamond-containing particles. For example, when surfaced modified by —OH, —COOH, —NH$_2$, alkyl, —SO$_3$H, or their combinations, the modified "fluorinated diamond-containing particles" can have a better dispersion in a polymer/organic system (e.g., a fluoroelastomer organic system) compared with unmodified "fluorinated diamond-containing particles". In another example, when surface modified by quarternized amine, carboxylated amine or their combinations, the modified "fluorinated diamond-containing particles" can have a better dispersion in an aqueous polymer system (e.g., an aqueous fluororesin system) compared with unmodified "fluorinated diamond-containing particles".

In various embodiments, the fluorinated diamond-containing particles can include nano-diamond particles having a size in the nanometer range from about 1 nm to about 1000 nm (1 micron). In various embodiments, the fluorinated nano diamond-containing particles can have a size ranging from about 1 nm to about 100 nm, or from about 20 nm to about 50 nm. It should be noted that size ranges can vary depending on a particular use or configuration of a particular application.

As used herein, average particle size refers to the average size of any characteristic dimension of a diamond-containing particle based on the shape of the particle(s), e.g., the median grain size by weight ($d_{50}$) as known to one of ordinary skill in the art. For example, the average particle size can be given in terms of the diameter of substantially spherical particles or nominal diameter for irregular shaped particles. Further, the shape of the particles can not be limited in any manner. Such nano-particles can take a variety of cross-sectional shapes including round, oblong, square, euhedral, etc.

In various embodiments, the fluorinated diamond-containing particles can be in a form of, for example, nanospheres, nanotubes, nanofibers, nanoshafts, nanopillars, nanowires, nanorods, nanoneedles and their various functionalized and derivatized fibril forms, which include nanofibers with exemplary forms of thread, yarn, fabrics, etc. In various other embodiments, the fluorinated diamond-containing particles can be in a form of, for example, spheres, whiskers, rods, filaments, caged structures, buckyballs (such as buckminster fullerenes), and mixtures thereof.

In various embodiments, the fluorinated diamond-containing particles can have a diamond core having a hardness of from about 9 to about 10 on Mohs hardness scale, where 10 is the maximum value on the Mohs hardness scale, e.g., for pure diamond particles. In some embodiments, the diamond core can have a hardness of from about 9.5 to about 10, or in some cases, form about 9.7 to about 10.

In various embodiments, the diamond core of the fluorinated diamond-containing particles can be formed from natural or synthetic diamond or combinations thereof. Natural diamonds typically have a face-centered cubic crystal structure in which the carbon atoms are tetrahedrally bonded, which is known as $sp^3$ bonding. Specifically, each carbon atom can be surrounded by and bonded to four other carbon atoms, each located on the tip of a regular tetrahedron. Further, the bond length between any two carbon atoms is 1.54 angstroms at ambient temperature conditions, and the angle between any two bonds is 109 degrees. The density of natural diamond is about 3.52 $g/cm^3$. A representation of carbon atoms bonded in a normal or regular tetrahedron configuration in order to form diamond is shown in FIG. 1A. In one embodiment, nano-diamonds can be produced by detonation of diamond blend, for example, followed by a chemical purification.

Synthetic diamond is industrially-produced diamond which is formed by chemical or physical processes, such as chemical vapor deposition or high pressures. Like naturally occurring diamond, the synthetic diamond can include a three-dimensional carbon crystal. Note that synthetic diamond is not the same as diamond-like carbon, which is an amorphous form of carbon.

Examples of synthetic diamond which can be useful for the exemplary embodiments can include polycrystalline diamond and metal bond diamond. Polycrystalline diamond can be grown by chemical vapor deposition as a flat wafer of, e.g., up to about 5 mm in thickness and up to about 30 cm in diameter or in some cases, as a three-dimensional shape. Polycrystalline diamond can have a popcorn-like structure. The diamond is usually black but can be made completely transparent. The crystal structure can be octahedral. Metal bond forms of synthetic diamond can be formed by pressing a mixture of graphite and metal powder for extended periods at high pressure. For example, a nickel/iron based metal bond diamond is produced by placing a graphite and nickel iron blended powder into a high pressure high temperature (HPHT) press for a sufficient period of time to form a product which imitates natural diamond. Other metals, such as cobalt, can also be used. After the diamond is removed from the press, it is subjected to a milling process. A chemical and thermal cleaning process can be utilized to scrub the surfaces. It may then be micronized to provide a desired size range. The particles thus formed can be flakes or tiny shards, with no consistent shape The crystal structure can be monocrystalline, as for natural diamond.

In various embodiments, the fluorinated diamond-containing particles can be used to form composite materials used as outermost layer of fuser members.

For illustrative purposes, although the term "fuser member" is used herein throughout the application, it is intended that the term "fuser member" also encompasses other members useful for a printing process or in a printer including, but not limited to, a fixing member, a pressure member, a heat member, and/or a donor member. In various embodiments, the "fuser member" can be in a form of, for example, a roller, a cylinder, a belt, a plate, a film, a sheet, a drum, a drelt (cross between a belt and a drum), or other known form for a fuser member.

In certain embodiments, the fuser member can include a substrate that is in a form of a belt substrate or a roll substrate. The thickness of the substrate in a belt configuration can be from about 50 µm to about 300 µm, and in some cases, from about 50 µm to about 100 µm. The thickness of the substrate in a cylinder or a roll configuration can be from about 2 mm to about 20 mm, and in some cases, from about 3 mm to about 10 mm.

Figure 1B:
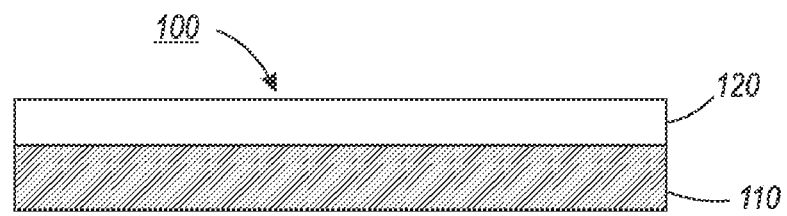
FIG. 1B depicts a portion of an exemplary fuser belt member in accordance with various embodiments of the present teachings.

FIG. 1B depicts a portion of an exemplary fuser belt member 100 in accordance with the present teachings. It should be readily apparent to one of ordinary skill in the art that the member 100 depicted in FIG. 1B represents a generalized schematic illustration and that other components/layers/films/particles can be added or existing components/layers/films/particles can be removed or modified.

As shown, the fuser member 100 can include a belt substrate 110, and an outermost layer 120 disposed over the belt substrate 110.

In various embodiments, one or more other functional layers can be disposed between the belt substrate 110 and the outermost layer 120. For example, the outermost layer 120 can be formed over a resilient layer (e.g., a silicone layer) that is formed over the belt substrate 110. In another example, an interfacial layer may further be disposed between the resilient layer and the outermost layer 120.

As disclosed herein, the belt substrate 110 can include, but is not limited to, a belt, a plate, a film, a sheet, or a drelt. In various embodiments, the belt substrate 110 can include a wide variety of materials, such as, for example, metals, metal alloys, rubbers, glass, ceramics, plastics, or fabrics. In an additional example, the metals used can include aluminum, anodized aluminum, steel, nickel, copper, and mixtures thereof, while the plastics used can include polyimide, polyester, polyetheretherketone (PEEK), poly(arylene ether), polyamide and mixtures thereof.

In various embodiments, the outermost layer 120 can include a plurality of fluorinated diamond-containing particles dispersed in a polymer matrix to provide an improved mechanical robustness, surface wear resistance, surface hydrophobicity, and/or thermo- or electrical-conductivity of the fuser member 100.

As used herein, the "polymer matrix" used for the disclosed outermost layer 120 can include one or more resins, such as, for example, fluororesins, fluoroplastics, and/or other thermosetting or thermoplastic resins. Examples of suitable fluororesins or fluoroplastics can include polytetrafluoroethylene, copolymer of tetrfluoroethylene and hexafluoropropylene, copolymer of tetrafluoroethylene and perfluoro(propyl vinyl ether), copolymer of tetrafluoroethylene and perfluoro(ethyl vinyl ether), copolymer of tetrafluoroethylene and perfluoro(methyl vinyl ether), or combinations thereof.

In various embodiments, fluororesins or fluoroplastics can be commercially known under various designations as TEFLON® PFA (polyfluoroalkoxypolytetrafluoroethylene), TEFLON® PTFE (polytetrafluoroethylene), and TEFLON® FEP (fluorinated ethylenepropylene copolymer). The TEFLON® designations are Trademarks of E.I. DuPont de Nemours, Inc. (Wilmington, Del.). In a specific embodiment, the polymer matrix used for the outermost layer 120 can be TEFLON® PFA.

Figure 1C:
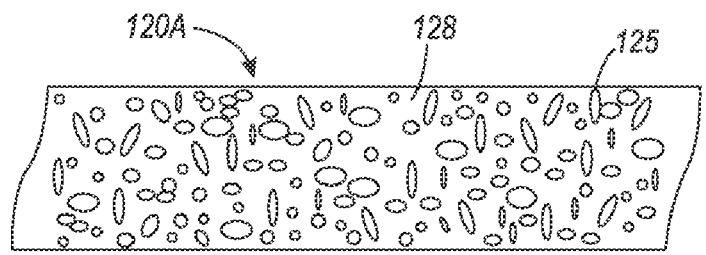
FIG. 1C is a schematic showing an exemplary outermost layer used for the fuser member in FIG. 1B in accordance with various embodiments of the present teachings.

FIG. 1C is a schematic showing an exemplary outermost layer 120a used for the fuser member 100 of FIG. 1B in accordance with the present teachings. It should be readily apparent to one of ordinary skill in the art that the outermost layer depicted in FIG. 1C represent a generalized schematic illustration and that other particles/fillers/layers can be added or existing particles/fillers/layers can be removed or modified.

As shown, the outmost layer 120a can include a plurality of fluorinated diamond-containing particles 125 dispersed within a polymer matrix 128. In various embodiments, the plurality of fluorinated diamond-containing particles 125 can be used as a filler material and can be dispersed randomly, uniformly and/or spatially-controlled throughout the polymer matrix 128, so as to substantially control, e.g., enhance, the physical properties including mechanical robustness, and/or, thermal-/electrical-conductivities of the resulting polymer matrices used as fuser materials in a variety of fusing subsystems and embodiments. In addition, the incorporation of disclosed fluorinated diamond-containing particles 125 can improve wear resistance of the outermost layer 120 due to a low friction coefficient. Further, the incorporation of disclosed fluorinated diamond-containing particles 125 can reduce surface free energy and/or increase surface hydrophobicity of the outermost layer 120, and thus provide an oil-less fusing surface.

In various embodiments, the outermost layer 120 can have an improved mechanical property such as an improved hardness as compared with conventional outermost layers (e.g., TEFLON® only) without using the disclosed particles 125. Hardness can generally be measured by, for example, Rockwell hardness test, Brinell hardness test, Vickers hardness test, Knoop hardness test, and Pencil hardness test as known to one of ordinary skill in the art. In various embodiments, the outermost layer 120 can have a hardness of about 1H or higher measured by the Pencil hardness test. In some cases, the hardness of the outermost layer 120 can range from about 1H to about 4H, or range from about 2H to about 4H.

In various embodiments, the outermost layer 120 can have an improved electrical conductivity, i.e., a reduced electrical resistivity. For example, the outermost layer 120 can have a surface resistivity of about $10^{15}$ ohm/sq or less. In an additional example, the surface resistivity of the outermost layer 120 can range from about $10^5$ ohm/sq to about $10^{15}$ ohm/sq, or range from about $10^7$ ohm/sq to about $10^{12}$ ohm/sq.

In various embodiments, the outermost layer 120 can have a desired outermost surface suitable for an oil-less fusing. Specifically, the outermost surface can be more hydrophobic as compared with conventional materials (e.g., TEFLON® only) without incorporating the disclosed particles 125. For example, the outermost surface can have a water contact angle of about 110 degrees or greater, or in some cases, ranging from about 110 degree to about 150 degree. In specific embodiments, the outermost surface can be super hydrophobic having a water contact angle of about 150 degree or greater.

In various embodiments, the disclosed outermost layer 120a can have a thickness of from about 1 micron to about 200 microns, in some cases, from about 10 microns to about 150 microns, or from about 20 microns to about 100 microns. In various embodiments, the polymer matrix 128 can account for at least about 50 percent and, in some embodiments, at least about 60 percent or at least about 70 percent by weight of the outermost layer 120a. The plurality of fluorinated diamond-containing particles 125 can be at least about 1 percent by weight of the outermost layer 120a and, in some embodiments, at least about 5 percent or at least about 10 percent by weight of the outermost layer 120a.

In various embodiments, the outermost layer 120 can further include other fillers, such as inorganic particles within the polymer matrix 128. In various embodiments, the inorganic particles can be selected from the group consisting of metal oxides, non-metal oxides, and metals. Specifically, the metal oxides can be selected from the group consisting of silicon oxide, aluminum oxide, chromium oxide, zirconium oxide, zinc oxide, tin oxide, iron oxide, magnesium oxide, manganese oxide, nickel oxide, copper oxide, antimony pentoxide, and indium tin oxide. The non-metal oxides can be selected from the group consisting of boron nitride, and silicon carbides (SiC). The metals can be selected from the group consisting of nickel, copper, silver, gold, zinc, and iron. In various embodiments, other additives known to one of ordinary skill in the art can also be included in the diamond-containing coating composites.

In various embodiments, a coating composition can be formed to prepare the disclosed outermost layer 120, 120a. The coating composition can be prepared to include, for example, an effective solvent, in order to disperse the plurality of fluorinated diamond-containing particles, one or more polymers and/or corresponding curing agents; and optionally, inorganic filler particles or surfactants that are known to one of the ordinary skill in the art.

The effective solvents can include water or organic solvents including, but not limited to, methyl isobutyl ketone (MIBK), acetone, methyl ethyl ketone (MEK), and mixtures thereof. Other solvents that can form suitable dispersions can be within the scope of the embodiments herein.

Various embodiments can thus include methods for forming the fuser member 100 using techniques including, but not limited to, coating techniques, extrusion techniques and/or molding techniques. As used herein, the term "coating technique" refers to a technique or a process for applying, forming, or depositing a dispersion to a material or a surface. Therefore, the term "coating" or "coating technique" is not particularly limited in the present teachings, and dip coating, painting, brush coating, roller coating, pad application, spray coating, spin coating, casting, or flow coating can be employed. For example, gap coating can be used to coat a flat substrate, such as a belt or plate, whereas flow coating can be used to coat a cylindrical substrate, such as a drum or fuser roll. Coated members can then be formed having various configurations.

In a certain embodiment, the coating composition can include an aqueous dispersion including fluorinated diamond-containing particles, TEFLON® fluoroplastics, and, optionally, inorganic fillers (e.g., MgO). For better dispersion in aqueous solution, fluorinated diamond-containing particles can be further modified with, for example, a quaternerized amine such as —NH—$(CH_2)_n$—$N^+R_1R_2R_3$, where n is from about 1 to about 8; and $R_1$, $R_2$ and $R_3$ each independently represents hydrogen, alkyl having from about 1 to about 16 carbon atoms, or a carboxylated amine such as —$N^+R_4R_5R_6$$(CH_2)_m COO^-$, where m is from about 1 to about 8; and $R_4$, $R_5$ and $R_6$ each independently represents hydrogen, and alkyl having from about 1 to about 16 carbon atoms. The coating composition can then be deposited, coated, or extruded on a substrate, such as a belt substrate, followed by a curing process. In various embodiments, the coating composition can be partially or wholly evaporated for a time length prior to the curing process to form the outermost layer. The curing process can be determined by the polymer(s) used and can include, for example, a step-wise curing process. However, any curing schedules known to those skilled in the art can be within the scope of embodiments herein.

Figure 2:
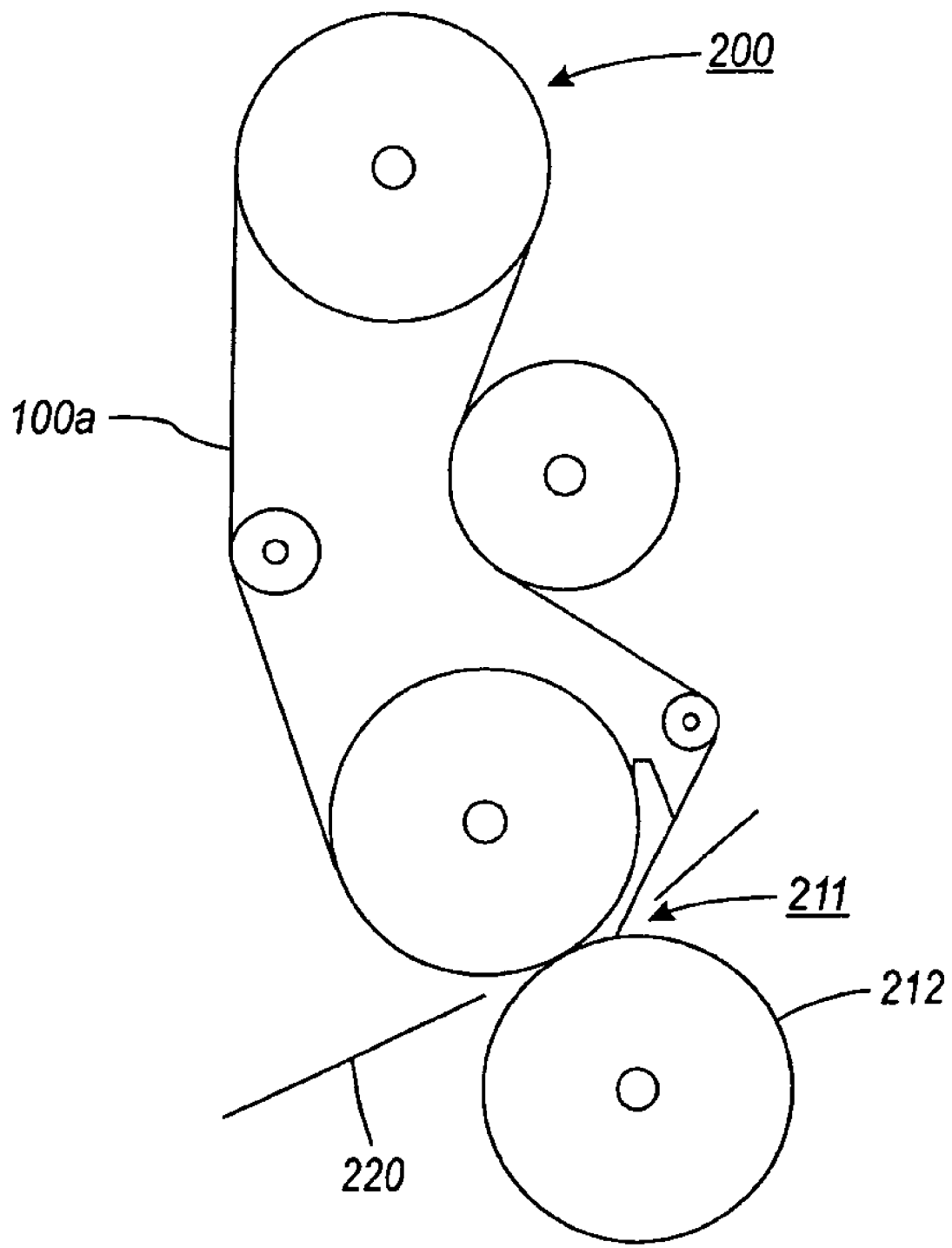
FIG. 2 is a schematic illustrating an exemplary fuser subsystem of a printing apparatus in accordance with various embodiments of the present teachings.

In an exemplary embodiment, the coated member can be used as a fuser member having a belt configuration. FIG. 2 schematically illustrates an exemplary fuser subsystem 200 in a belt configuration of a xerographic printer in accordance with the present teachings. The exemplary fuser subsystem 200 can include a fuser belt 100a and a rotatable pressure roll 212 that can be mounted forming a fusing nip 211. A media 220 carrying an unfused toner image can be fed through the fusing nip 211 for fusing.

In various embodiments, the fuser belt 100a and the pressure roll 212 can include a top-coat layer or an outermost layer 120, 120a, a plurality of fluorinated diamond-containing particles 125 dispersed in an exemplary fluoroplastic 128, disposed over a belt substrate 110 as shown in FIGS. 1B-1C. The outermost layer 120, 120a can thus have a continual self-releasing surface, an improved mechanical property, surface wear resistance and desired thermal-/electrical-conductivity.

Specifically, the disclosed exemplary outermost layer 120, 120a of the fuser member 110, 100a including a plurality of fluorinated diamond-containing particles 125 dispersed in a fluororesin 128 possesses a low surface energy and chemical inertness, needed for oil-less fusing. In addition, the fluorinated diamond-containing particles 125 in the outermost layer 120 can result in an increase in the top-coat modulus, and a decrease in lead or side edge wear since paper edges may slide upon contact with a low surface energy fusing surface desired for long life of the fuser member 110, 110a.

EXAMPLES

Example 1

Preparation of an Outermost Fuser Material

A coating composition is prepared by mixing the fluorinated nano diamond particles (NB90-F, 90 percent of $sp^3$ carbon and 10 percent of fluorinated $sp^2$ carbon available from Nanoblox Inc., Boca Raton, Fla.) with TEFLON® PFA TE7224 from DuPont in water with a weight ratio of 10/90.

The prepared coating composition is then coated on an exemplary glass plate to form a film via a draw bar coating process.

The film is further heated to cure at high temperatures of from about 300° C. to about 400° C., or about 360° C. for a period of from about 1 to about 60 minutes, or about 10 minutes to form a chemically and thermally stable, tough coating with increased electrical conductivity and improved mechanical properties. Such coating is used as an outermost fuser material.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A fuser member comprising:
   a substrate; and
   an outermost layer disposed over the substrate, wherein the outermost layer comprises a plurality of fluorinated nano diamond-containing particles dispersed in a fluoroplastic matrix and wherein each particle of the plurality of fluorinated nano diamond-containing particles comprises a chemically active shell layer that is fluorinated over a chemically inert diamond core.

2. The member of claim 1, wherein the substrate is a belt, a plate, a film, a sheet, or a drelt.

3. The member of claim 1, wherein the substrate is formed of a material selected from the group consisting of a metal, a plastic, and a ceramic,
   wherein the metal comprises a material selected from the group consisting of an aluminum, an anodized aluminum, a steel, a nickel, a copper, and mixtures thereof, and
   wherein the plastic comprises a material selected from the group consisting of a polyimide, a polyester, a polyetheretherketone (PEEK), a poly(arylene ether), a polyamide, and mixtures thereof.

4. The member of claim 1, wherein the chemically active shell layer comprises a $sp^2$ carbon black and a functional group comprising a quarternized amine, a carboxylated amine or combinations thereof.

5. The member of claim 1, wherein the plurality of fluorinated diamond-containing particles are present in the outermost layer in an amount of from about 1 percent to about 50 percent by weight.

6. The member of claim 1, wherein the fluoroplastic matrix comprises a material selected from the group consisting of polytetrafluoroethylene, copolymer of tetrifluoroethylene and hexafluoropropylene, copolymer of tetrafluoroethylene and perfluoro(propyl vinyl ether), copolymer of tetrafluoroethylene and perfluoro(ethyl vinyl ether), copolymer of tetrafluoroethylene and perfluoro(methyl vinyl ether) and combinations thereof.

7. The member of claim 1, wherein the surface of the outermost layer has a water contact angle of from about 110 degrees to about 150 degrees.

8. The member of claim 1, wherein the outermost layer has a surface resistivity ranging from about $10^5$ ohm/sq to about $10^{15}$ ohm/sq.

9. The member of claim 1, wherein the outermost layer has a hardness of from about 1H to about 4H measured by a pencil hardness test.

10. The member of claim 1, wherein the chemically active shell layer comprises a $sp^2$ carbon black and a functional group comprising —OH, —COOH, —NH$_2$, —SO$_3$H, alkyl, a carboxylated amine, a quaternized amine or combinations thereof.

\* \* \* \* \*